(12) United States Patent
Alford et al.

(10) Patent No.: US 11,964,845 B2
(45) Date of Patent: *Apr. 23, 2024

(54) CORD REEL ASSEMBLY WITH CONTINUOUS CORD

(71) Applicants: John Alford, Kenosha, WI (US); Christopher Hinojosa, Winthrop Harbor, IL (US)

(72) Inventors: John Alford, Kenosha, WI (US); Christopher Hinojosa, Winthrop Harbor, IL (US)

(73) Assignee: Astronics Connectivity Sys. & Cert. Corp., Waukegan, IL (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/120,847

(22) Filed: Dec. 14, 2020

(65) Prior Publication Data

US 2021/0094792 A1      Apr. 1, 2021

Related U.S. Application Data

(63) Continuation of application No. 16/307,256, filed on Dec. 5, 2018, now Pat. No. 10,865,067, which is a continuation-in-part of application No. 15/175,847, filed on Jun. 7, 2016, now Pat. No. 9,745,168, which is a continuation of application No. PCT/US2017/036364, filed on Jun. 7, 2016.

(51) Int. Cl.
*B65H 75/44*     (2006.01)
*H02G 11/02*     (2006.01)

(52) U.S. Cl.
CPC ..... *B65H 75/4449* (2013.01); *B65H 75/4471* (2013.01); *H02G 11/02* (2013.01); *B65H 2701/34* (2013.01)

(58) Field of Classification Search
CPC .................................................. B65H 75/4449
USPC ........................................................ 174/74 R
See application file for complete search history.

(56) References Cited

U.S. PATENT DOCUMENTS

| | | | |
|---|---|---|---|
| 4,384,688 A * | 5/1983 | Smith ..................... | H02G 11/02 242/379 |
| 7,172,150 B1 * | 2/2007 | Hutchison, II ......... | B65H 75/48 242/378.2 |
| 10,188,846 B1 * | 1/2019 | Priszner ............. | B65H 75/4471 |
| 2005/0252115 A1 * | 11/2005 | Smith ...................... | H02G 3/32 52/220.8 |
| 2011/0137382 A1 * | 6/2011 | Swanson .............. | A61N 1/0553 607/72 |
| 2014/0263801 A1 * | 9/2014 | Skowronski ....... | B65H 75/4449 242/397.5 |
| 2017/0299835 A1 * | 10/2017 | Alford ............... | B65H 75/4449 |

* cited by examiner

*Primary Examiner* — Stanley Tso
(74) *Attorney, Agent, or Firm* — Vitale, Vickrey, Niro, Solon & Gasey LLP

(57) ABSTRACT

A cord reel assembly including a single, continuous cord having stationary and retractable segments, with the stationary segment including multiple connectors and sheath covering such connectors where the connectors twist and untwist relative to the sheath in response to the retract and extension of the retractable segment.

8 Claims, 2 Drawing Sheets

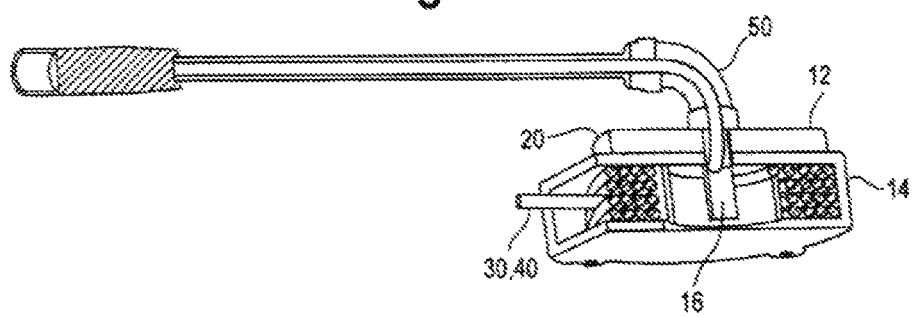
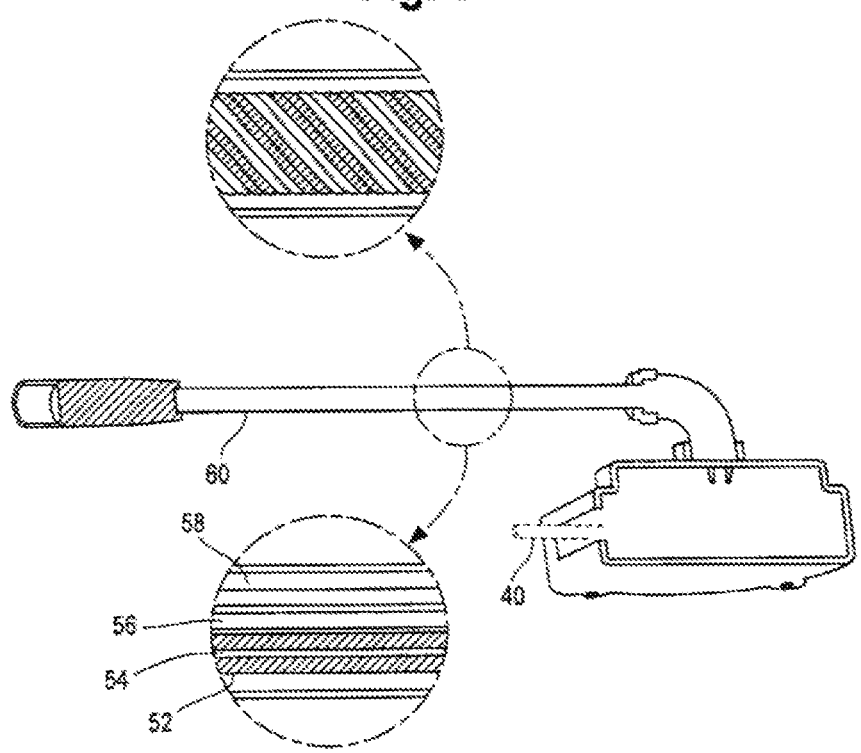

CORD REEL ASSEMBLY WITH CONTINUOUS CORD

RELATED APPLICATIONS

This application is a continuation of U.S. patent application Ser. No. 16/307,256, now U.S. Pat. No. 10,865,067 issued on Dec. 15, 2020 which is a continuation-in-part of U.S. patent application Ser. No. 15/175,847, filed Jun. 7, 2016, now U.S. Pat. No. 9,745,168 issued on Aug. 29, 2017, which claims priority to International PCT/US2017/036364, filed Jun. 7, 2017.

FIELD OF INVENTION

The present disclosure relates to a cord reel assembly for supplying a retractable cord to electronic devices and the like. More specifically, the present disclosure includes a cord reel having a continuous cord with a retractable end with a jacket or similar covering to protect from wear and tear, a stationary end having a sheath and multiple connectors that can twist and untwist relative to the sheath, and a transition chamber to facilitate the meeting of the two ends, whereby the connectors in the stationary end twist and untwist in response to the extension and retraction of the retractable end.

BACKGROUND OF THE INVENTION

Retractable cord reels have been used in various applications to retractably store various types of cables. The cable held on the reel typically has a stationary end portion and a portion that may be extended from and retracted back into the reel. Conventionally, the reel comprises a spring-loaded spool on which the extendable portion of cable is wound. The extendable portion of the cable may be withdrawn from the reel, causing the spool to rotate against the force of the spring. Upon release of the cable, the spring causes the spool to rotate in the opposite direction thereby retracting the cable back onto the spool. A problem common to all prior art cord reels is providing a continuous electrical and data connection between the rotating extendable portion of the cable and the stationary end portion. Two basic types of cord reels have been developed to address this problem.

One type of reel utilizes rotating contacts, commonly placed between the rotating reel and a stationary housing. The stationary end portion of the cable is separate from the extendable portion. The stationary cable is connected to the contacts carried by the housing, and the extendable portion is connected to the contacts carried by the reel. When the reel rotates, substantially continuous contact is made between the rotating contacts. However, there are numerous, well documented disadvantages of cord reels having moving contacts. Moving contacts have a propensity to spark, making such reels unsuitable for use in wet environments, hazardous environments and in medical applications, among others.

To overcome these problems, a second type of retractable cord reel has been developed that eliminates contacts. The reel comprises a spool on which the extendable portion of cord is held, an expansion chamber in which a fixed length of cable is spirally wound. The two cable portions are connected, typically in or adjacent the hub of the spool. As the spool rotates the spirally wound, fixed cable expands and contracts within the expansion chamber. An example of reels of this type is disclosed in U.S. Pat. No. 5,094,396 to Burke, the disclosures of which are hereby incorporated by reference.

Regardless of the success of this second kind of cord reel, it would be advantageous to have a cord reel assembly without any need for connections, which can be the subject of defects in soldering, potting chambers or similar connection points. In order to ensure a more durable and more reliable system for connecting to and supporting electronics connected to cord reels, it is necessary to provide a cord configuration to enable the connection of a continuous cord to such devices.

To date, however, there are no available products that permit a continuous cord to provide a cord reel with retractable and stationary ends.

What is needed is a cord reel assembly having retractable and stationary ends which employ a single, continuous cord so as to eliminate electrical and/or mechanical interconnection points in connecting to electronic devices.

DEFINITION OF TERMS

The following terms are used in the claims of the patent as filed and are intended to have their broadest plain and ordinary meaning consistent with the requirements of the law.

A "sheath" refers to a plastic and or metallic protective layer (made with, for example PTFE) which surrounds the plurality of connectors but which is capable of permitting helical or twisting movement of the connectors relative thereto.

A "connector" refers to a contiguous physical structure for conducting power and/or a signal from the terminal end of the stationary portion of the cord to the terminal end of the retractable portion of the cord.

Where alternative meanings are possible, the broadest meaning is intended. All words used in the claims set forth below are intended to be used in the normal, customary usage of grammar and the English language.

OBJECTS AND SUMMARY OF THE DISCLOSURE

The apparatus and method of the present disclosure generally includes a cable (e.g. electrical, data or mechanical) that is connected to a cord reel housing that includes a spool within the housing and capable of rotating relative to the housing. The spool and housing define a single storage chamber for holding a cord, and a transition chamber. The cord contained within the storage chamber is a single cord, and the single cord further traverses the interior of the housing, and terminates in retractable and stationary ends external to the housing. The retractable portion of the housing includes a jacket or covering for enclosing any connectors within the cord and for enabling the retraction and extension of the cord while affording a degree of protection from wear.

On the stationary end of the cord, the connectors have the jacket stripped away from the connectors, but as the connectors extend away from the housing on the stationary end, they are protected by a sheath of durable material. The connectors, however, may twist relative to the sheath so that when the spool is rotated and the cord is extended, the connectors in the stationary end of the cord will compensate by moving from a generally untwisted to a twisted configuration, thus permitting the connectors comprising the cord to compensate for the tension created by the extension of the retractable end of the cord. Thus, the assembly supports a single continuous cord comprised of multiple connectors which allows for one side to retract and extend while keeping the other end stationary.

The immediate application of the present invention will be seen in the context of retractable electric cords for supplying power and/or data to connected electronics, though those of skill will see that the present invention could be applied to non-electrical cord applications where supply of data and/or power through the cord is not needed (e.g., in wireless hub configuration or strictly mechanical application).

Thus can be seen that one object of the present invention is to provide a cord reel assembly having a single cord with one stationary end and one retractable end.

A further object of the present invention of the present invention is to provide a cord reel assembly with a cord having a single chamber that does not require any soldering or potting to connect cord segments.

Still another object of the present invention is to provide a cord with contiguous segments that allows one segment to extend or retract, while keeping the length of extension of the other segment constant.

Yet another object of the present invention is to provide a cord reel assembly that eliminates the need for axially displace chambers for storage of separate cord segments.

It should be noted that not every embodiment of the claimed invention will accomplish each of the objects of the invention set forth above. In addition, further objects of the invention will become apparent based on the summary of the invention, the detailed description of preferred embodiments, and as illustrated in the accompanying drawings. Such objects, features, and advantages of the present invention will become more apparent in light of the following detailed description various embodiments thereof, and as illustrated in the accompanying drawings.

BRIEF DESCRIPTION OF THE DRAWINGS

FIG. 2 shows an exposed side view of the cord reel in accord with another embodiment of the present invention.

FIG. 3 shows the detail of the twisted and untwisted arrangement of the connectors comprising the stationary end of the cord in response to the extension and retraction of the retractable end of the cord in accord with one embodiment of the present invention.

DETAILED DESCRIPTION OF THE INVENTION

Figure 1:
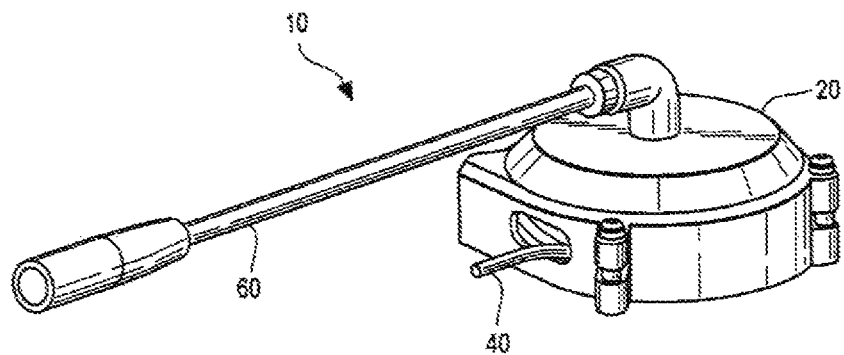
FIG. 1 shows a first example embodiment of cord reel assembly with a stationary end having a sheath for cover the plurality of connectors comprising the stationary segment of the cord in accord with a preferred embodiment of the present invention.

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

FIGS. 1 and 2 show an example cord reel assembly 10 in accord with a first preferred embodiment of the present invention. Specifically, the assembly a housing 12 having a single storage chamber 14 and a transition chamber 16. Inside the housing is a spool 20 rotates relative to the housing to facilitate retraction and extension of a cord 30. As shown in FIGS. 2 and 3, the cord 30 is a single cord traversing the interior of the housing 20 and terminating in retractable 40 and stationary 50 segments which end external to the housing. The cord 30 in this embodiment is an electrical cord which can supply power and/or data therethrough, although persons of skill in the art will recognize that the present disclosure can apply to mechanical (i.e., not electrical) tethering cords, too.

The retractable segment 40 is a typical cord configuration known to those of skill in the art, i.e., a number of connectors (52, 54, 56, 58) surrounded optionally by a nylon jacket 42 or similar protective cover to provide durability against normal wear and tear of the cord during extension and retraction.

By contrast, the stationary segment 50 of the cord 30 extends from the transition chamber without any jacket (jacket 42 having been stripped away or otherwise not provided to the stationary segment 50). The stationary segment, however, has the same connectors (52, 54, 56, 58) which are surrounded by a sheath (60), preferably made of a comparatively rigid, durable material such as PTFE, the sheath 60 preferably extending along the entire exposed length of the stationary segment 50 of the cord 30, the sheath 60 being anchored to the housing 12 and a plurality of connectors (e.g., 54, 56) twisted about one another, the plurality of connectors being capable of twisting and untwisting along the length of the cord from the transition chamber up to the stationary end relative to the sheath to support extension and retraction of the retractable end of the cord 40 relative to the housing 12. For instance, as shown in FIG. 3, if the retractable end 40 of the cord 30 is extended, the stationary segment 50 compensates for the strain caused by such an extension by twisting and untwisting the connectors 52, 54, 56, 58. Since the connectors can twist relative to the sheath, such twisting does not create movement in the stationary end 50 of the housing.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the specific relationship between the status of the retractable end of the cord (i.e., extended or retracted) and the status of the connectors on the stationary end (i.e., twisted or untwisted) can be switched. That is the twisting of the connector can occur for a given assembly while the retractable cord is extended, or when it is retracted.

Similarly, while the preferred embodiments of the present invention are focused upon use with a rigid PTFE sheath 60, those of skill in the art will understand that the invention has equal applicability other coverings which permit movement of the stationary segment portion of the connectors relative to such coverings. In addition, the placement of the sheath and the extension of the connectors 52, 54, 56, 58 does not have to be at the center of the housing 12. Persons of skill in the art will appreciate that the extension of the stationary end 50 may be better extend elsewhere from the housing 12 so as to avoid undue strain on cord 30. Likewise, it will be appreciated by those skilled in the art that various changes, additions, omissions, and modifications can be made to the illustrated embodiments without departing from the spirit of the present invention. All such modifications and changes are intended to be covered by the following claims.

What is claimed is:

1. A retractable cord, reel apparatus, the apparatus comprising
   a) a housing having a single storage chamber and a transition chamber;
   b) a spool within and arranged for rotation relative to the housing;
   c) a single cord comprising a plurality of connectors,
      a retractable segment sheath for a retractable end and a flexible sheath for a stationary end,
      the single cord traversing the interior of the housing and terminating in retractable and stationary ends external to the housing,
      wherein the plurality of connectors twist in response to the retraction of the retractable end of the cord;
   wherein, the stationary end of the cord extends from the transition chamber and comprises the flexible sheath anchored to the housing and adjacent to and surrounding the plurality of connectors twisted about one another,
      the plurality of connectors being capable of twisting and untwisting relative to one another inside the flexible sheath without rotation of the flexible sheath along the length of the cord from the transition chamber up to the stationary end to support extension and retraction of the retractable end of the cord relative to the housing.

2. The retractable cord reel apparatus of claim 1 wherein the plurality of connectors are electrical connectors.

3. The retractable cord reel apparatus of claim 1 wherein the plurality of connectors are data connectors.

4. The retractable cord reel apparatus of claim 1 wherein the plurality of connectors provide solely a mechanical connection.

5. A retractable cord reel apparatus, the apparatus comprising
   a) a housing having a single storage chamber and a transition chamber;
   b) a spool within and arranged for rotation relative to the housing;
   c) a single cord comprising a plurality of connectors, a retractable segment sheath for a retractable end and a flexible sheath for a stationary end, the single cord traversing the interior of the housing and terminating in retractable and stationary ends external to the housing, wherein the plurality of connectors twist in response to the extension of the retractable end of the cord;
   d) wherein, the stationary end of the cord extends from the transition chamber and comprises the flexible sheath anchored to the housing and adjacent to and surrounding the plurality of connectors twisted about one another, the plurality of connectors being capable of twisting and untwisting relative to one another inside the flexible sheath without rotation of the flexible sheath along the length of the cord from the transition chamber up to the stationary end to support extension and retraction of the retractable end of the cord relative to the housing.

6. The retractable cord reel apparatus of claim 5 wherein the plurality of connectors are electrical connectors.

7. The retractable cord reel apparatus of claim 5 wherein the plurality of connectors are data connectors.

8. The retractable cord reel apparatus of claim 5 wherein the plurality of connectors provide solely a mechanical connection.

* * * * *